Oct. 3, 1950 O. N. BRYANT 2,524,693
FLEXIBLY MOUNTED COMBINED RADIAL AND THRUST BEARING
Filed Feb. 7, 1947 2 Sheets-Sheet 1
FIG.1.
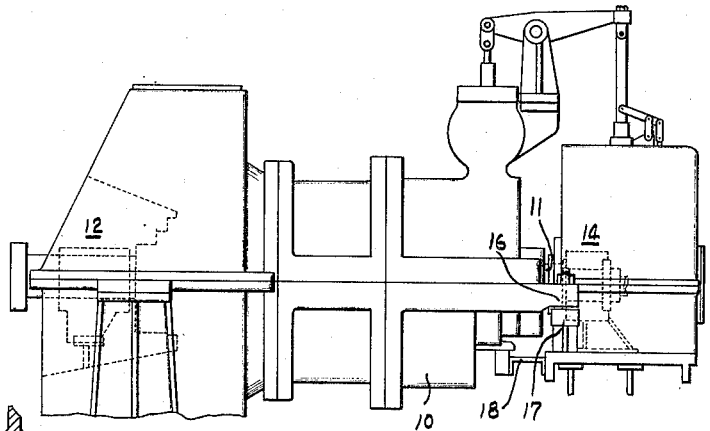
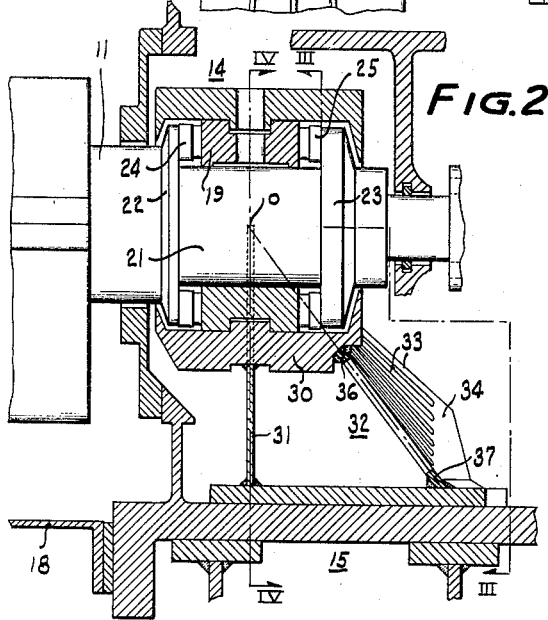
FIG.2. FIG.3.
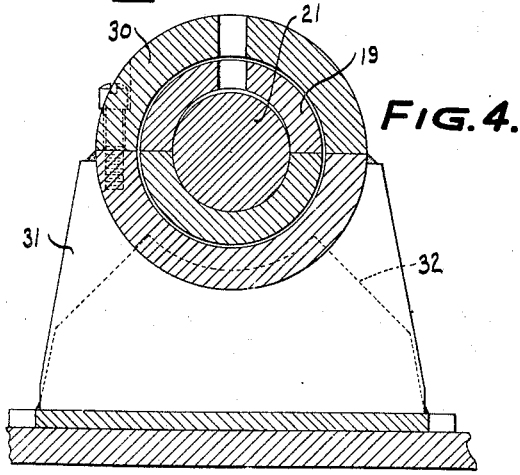
FIG.4.
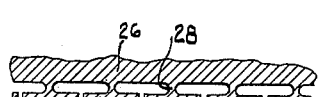
FIG.6.
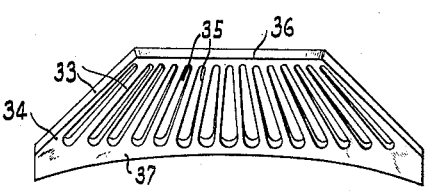
FIG.5.
INVENTOR
OZRO N. BRYANT
BY
ATTORNEY Oct. 3, 1950 — O. N. BRYANT — 2,524,693
FLEXIBLY MOUNTED COMBINED RADIAL AND THRUST BEARING
Filed Feb. 7, 1947 — 2 Sheets-Sheet 2

INVENTOR
OZRO N. BRYANT
BY
ATTORNEY

Patented Oct. 3, 1950

2,524,693

UNITED STATES PATENT OFFICE 2,524,693

FLEXIBLY MOUNTED COMBINED RADIAL AND THRUST BEARING

Ozro N. Bryant, Prospect Park, Pa., assignor to Westinghouse Electric Corporation, East Pittsburgh, Pa., a corporation of Pennsylvania Application February 7, 1947, Serial No. 727,134

6 Claims. (Cl. 308—26)

The invention relates to a combined radial and thrust bearing and it has for an object to provide improved means for supporting the bearing radially and axially while providing for angular movement thereof in any direction to accommodate for angular misalignment.

A more particular object of the invention is to provide a combined radial and thrust bearing supported radially and axially by means of a flexible plate and spoke or rod members, the plate being arranged so that its plane intersects the bearing axis in normal transverse relation and the spokes or rod members being arranged in conical formation with each spoke or rod member radiating from said point of intersection and having components of direction which are radial axial in relation to the bearing axis.

The foregoing and other objects are effected by the invention as will be apparent from the following description and claims taken in connection with the accompanying drawings, forming a part of this application, in which:

Fig. 1 is a side elevational view of a turbine having the improved bearing applied thereto;

Fig. 2 is a longitudinal sectional view of the improved bearing;

Figs. 3 and 4 are sectional views taken along the lines III—III and IV—IV of Fig. 2;

Fig. 5 is a detailed view showing a conical plate element slotted to provide the conical arrangement of rod or spoke elements;

Fig. 6 is a detail view showing one of the thrust components of the combined radial and thrust bearing;

Figure 7:
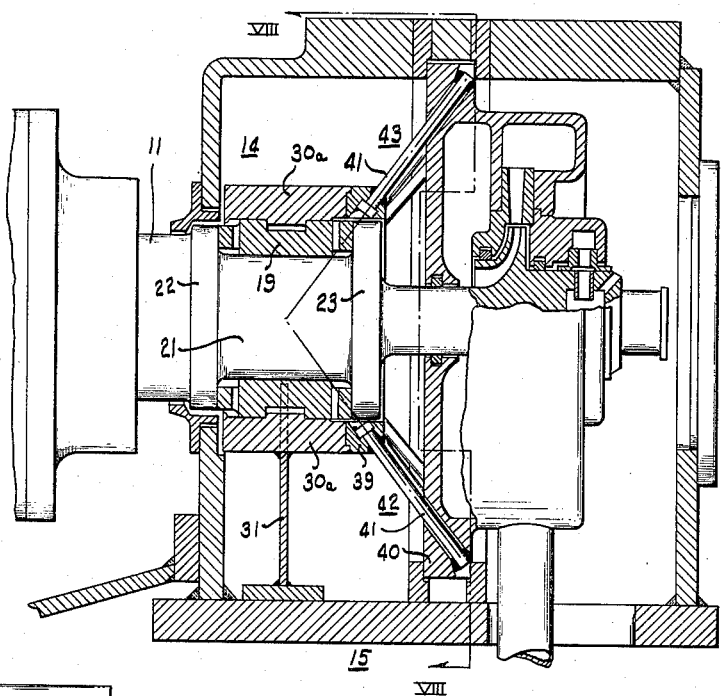
Fig. 7 is a view similar to Fig. 2, but showing a modified form of the invention.

In the drawings, there is shown a turbine including a casing 10 and a rotor 11. The rotor is supported by bearings, at 12 and at 14. The bearing, at 12, is carried by the turbine casing and the bearing, at 14, is carried by the pedestal structure, at 15.

The high-pressure end of the turbine casing 10 has feet 16 resting on supports 17 unitary with the pedestal structure. The pedestal structure is connected to the casing 10 by means of a web member 18, which is flexible vertically and stiff horizontally. With the weight of the high-pressure end of the turbine casing carried through the feet 16 to the supports 17 and with the casing connected to the pedestal structure by the flexible web 18, provision is thereby made for radial expansion and contraction of the turbine casing in all directions while the latter is connected axially to the pedestal structure.

The bearing, at 14, includes a bearing sleeve 19 cooperating with the journal 21 formed on the rotor. As shown, the rotor has collars 22 and 23 in spaced relation to opposite ends of the sleeve 19. The spaces between the ends of the sleeve 19 and the collars provide accommodation for thrust bearing components 24 and 25. While any suitable thrust bearing components may be used, as shown in Fig. 6, each component includes a base ring 26 connected to segmental shoes 27 by means of flexible necks 28. The combined radial and thrust bearing described includes a housing member 30.

The combined radial and thrust bearing is supported radially and axially while being permitted to tilt angularly in any direction to accommodate for angular misalignment. To this end, the bearing housing 30 is supported from the pedestal structure, at 15, by means of a flexible web 31 and by a spoke or rod member arrangement, at 32.

The plane of the web 31 extends in normal transverse relation to the bearing axis so as to intersect the latter at "0" and the conical arrangement of rod or spoke members, at 32, has the spoke or rod elements 33 thereof radiating in relation to the point of intersection "0" and each having radial and axial components of direction. With this arrangement, it will be apparent that the web 31 and the spoke members 33 are capable of flexing so that the bearing is capable of tilting angularly in all directions, the web member supporting the bearing radially and the axial components of the spoke or rod members providing a thrust connection between the pedestal and the bearing to support the latter axially for accommodation of angular misalignment without axial movement of the bearing.

In Figs. 2, 3 and 4, the conical arrangement of spoke or rod members, at 32, is provided by means of a conical plate 34 which is slotted, as shown at 35, to provide intervening spokes or rod elements. Beyond the ends of the slots 35, the conical plate has an inner arcuate portion 36 welded to the bearing housing 30 and an outer arcuate portion 37 welded to the pedestal structure.

In Figs. 2, 3 and 4 the conical arrangement of spoke or rod elements, at 32, is disposed below the bearing so that the spokes or rod elements 33 are arranged symmetrically in relation to the vertical plane of the bearing axis. Not only does this arrangement provide radial support for the bearing, but the spoke members give increasing horizontal radial support to the bearing the nearer they approach the horizontal plane of the bearing axis.

Figures 8, 9, 10:
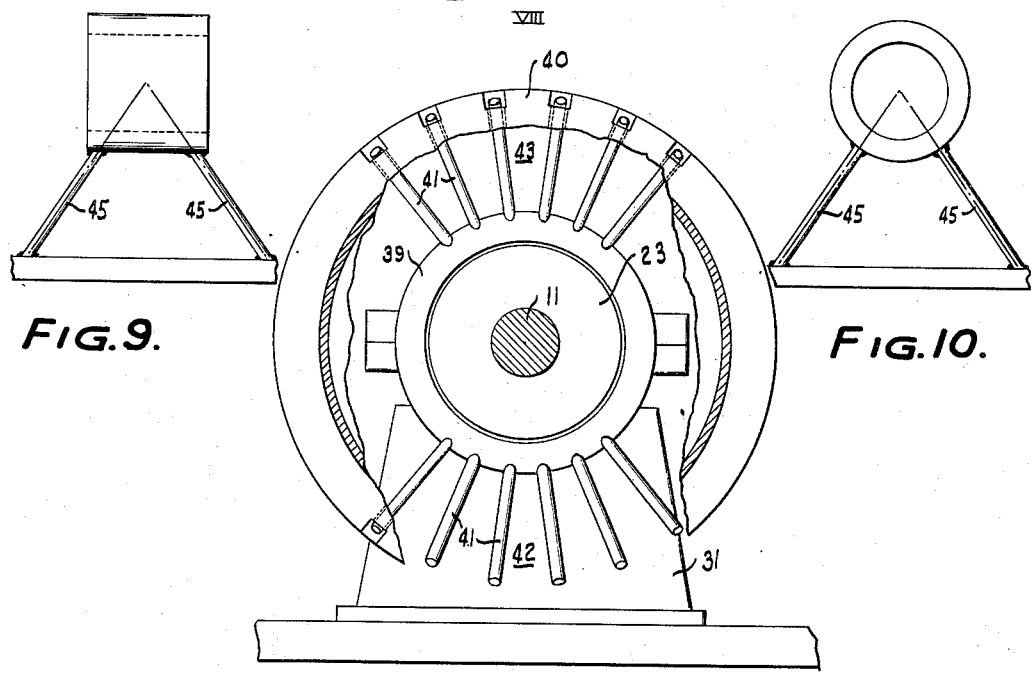
Fig. 8 is a view taken along the line VIII—VIII of Fig. 7.
Figs. 9 and 10 show a further modified form of the invention.

In the modified form of the invention shown in Figs. 7 and 8, the bearing housing 30a and the pedestal structure, at 15, are provided with ring elements 39 and 40, respectively, and the ring elements are connected by a conical arrangement of spokes or rod members 41. As shown, the conical arrangement of spokes or rod members includes a lower group, at 42, and an upper group, at 43, with the spoke or rod members of each group arranged in symmetrical relation with respect to the vertical plane of the bearing axis.

From the structure described, it will be apparent that the flexible web 31 supports the combined radial and thrust bearing radially and that the conical arrangement of spoke or rod members supports the bearing axially, the spoke or rod members radiating from the point of intersection of the plane of the web member with the bearing axis so that they are capable of flexing to accommodate flexure of the web member incident to tilting of the bearing to accommodate for angular misalignment.

From the structures so far described, it will be apparent that the web and rod elements are each transversely flexible and that each is capable of sustaining loads dependent upon its direction of extent. If, as with the web element, the direction of extent is in a plane normal to the bearing axis, then its radial load-sustaining component is a maximum and its axial load-sustaining component is a minimum. On the other hand, if, as with a rod or spoke element, the direction of extent has both radial and axial components, then provision is thereby made for sustaining both axial and radial loads. While I prefer to use a web element to carry the radial load of the bearing, it will be apparent that it may be omitted and reliance placed entirely upon the rod or spoke elements which have capacity for sustaining both radial and axial loads. Accordingly, in Figs. 9 and 10, the bearing is supported by rods 45, each of which radiates from the bearing center and extends both axially and radially to carry radial and thrust loads.

While the invention has been shown in several forms, it will be obvious to those skilled in the art that it is not so limited, but is susceptible of various other changes and modifications without departing from the spirit thereof.

What is claimed is:

1. The combination with a rotor and supporting structure, a combined radial and thrust bearing for the rotor, web means carried by the supporting structure for supporting the bearing radially, and a conical arrangement of rod members having their outer ends connected to the supporting structure and having their inner ends connected to the bearing, said web means being disposed so that its plane intersects the bearing axis and said rod members being disposed so that the longitudinal axes thereof are inclined with respect to the bearing axis and intersect at said point of intersection, whereby each rod member has components of direction which are radial and axial in relation to the axis of the bearing.

2. Apparatus as claimed in claim 1 wherein the conical arrangement of rod members is comprised by a group disposed symmetrically below the bearing in relation to the vertical plane of the bearing axis.

3. Apparatus as claimed in claim 1 wherein the conical arrangement of rod members includes groups of such members arranged above and below the bearing and in symmetrical relation with respect to the vertical plane of the bearing axis.

4. The combination with a rotor and supporting structure, a combined radial and thrust bearing for the rotor, and rod members having their inner ends connected to the bearing and having their outer ends connected to the supporting structure, said rod members having their longitudinal axes inclined with respect to the bearing axis and intersecting at the center of the bearing, whereby the rod members each extend both radially and axially with respect to the bearing axis to carry bearing radial and thrust loads.

5. The combination with a rotor and supporting structure, a bearing for the rotor and sustaining radial and thrust loads of the latter, and means for supporting the bearing from said supporting structure so that its center is held axially, vertically and horizontally and so that it may tilt angularly in all directions with respect to said center to maintain alignment thereof with the rotor, said last-named means including supporting rod members whose longitudinal axes are inclined with respect to the bearing axis and which intersect at the bearing center so as to be elastically deformable in axial planes and in directions which are tangential in relation to said center.

6. The combination with a rotor and supporting structure, a bearing for the rotor and sustaining radial and thrust loads of the latter, and means for supporting the bearing from said supporting structure so that its center is held axially, vertically and horizontally and so that it may tilt angularly in all directions with respect to said center to maintain alignment thereof with the rotor, said last-named means including a pair of groups of oppositely-inclined supporting rod members whose longitudinal axes are inclined with respect to the bearing axis and which intersect at the bearing center so as to be elastically deformable in axial planes and in directions which are tangential in relation to said center.

OZRO N. BRYANT.

REFERENCES CITED

The following references are of record in the file of this patent:

UNITED STATES PATENTS

| Number | Name | Date |
|---|---|---|
| 2,030,193 | Arnold | Feb. 11, 1936 |
| 2,159,545 | Bartosch | May 23, 1939 |

FOREIGN PATENTS

| Number | Country | Date |
|---|---|---|
| 363,472 | Great Britain | 1931 |